W. C. HEDGCOCK.
BRAKE ARRANGEMENT.
APPLICATION FILED JULY 5, 1917.
1,283,759.
Patented Nov. 5, 1918.
3 SHEETS—SHEET 1.
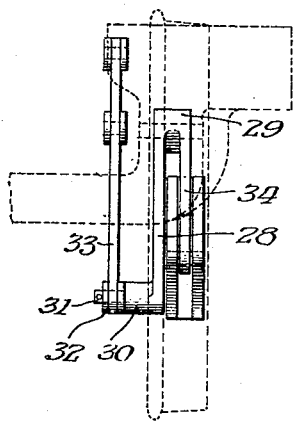
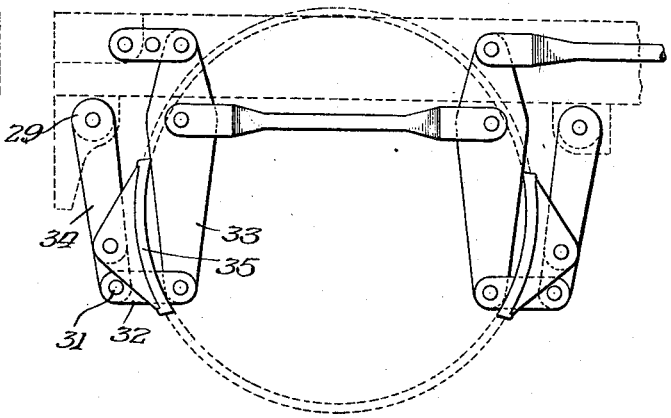
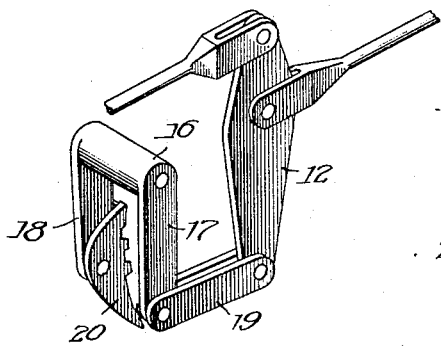
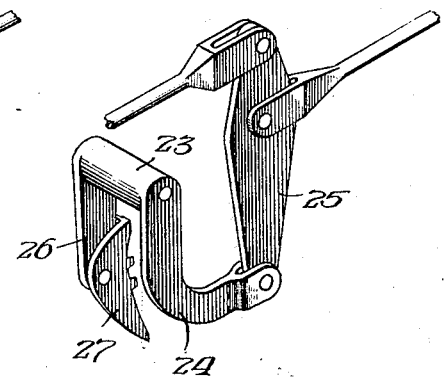
Witnesses:
Inventor
William C. Hedgcock
By Wilkinson & Huxley
Attys.

W. C. HEDGCOCK.
BRAKE ARRANGEMENT.
APPLICATION FILED JULY 5, 1917.
1,283,759.
Patented Nov. 5, 1918.
3 SHEETS—SHEET 2.
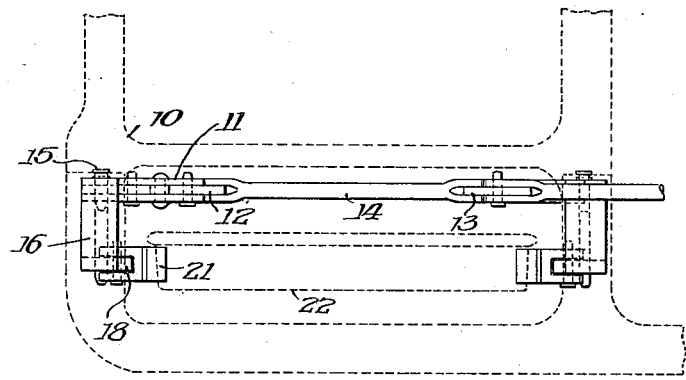
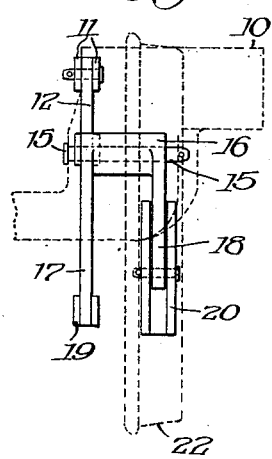
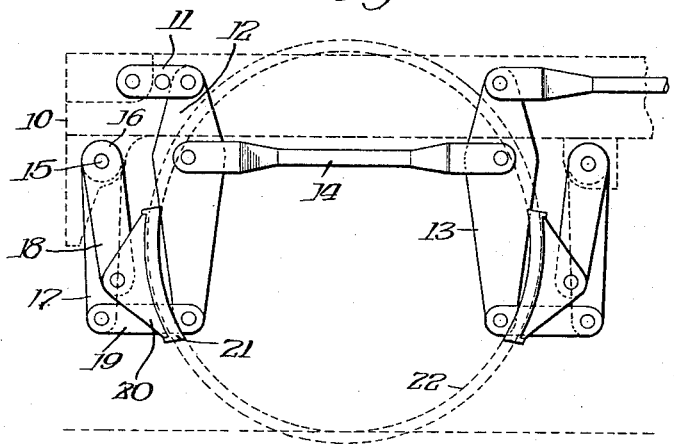
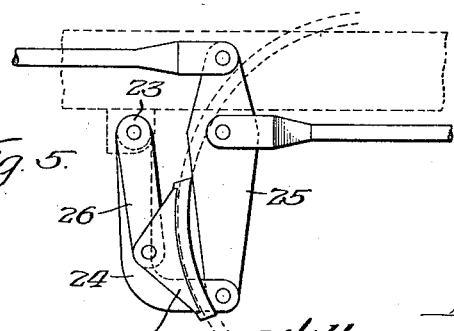
Witnesses:
Inventor:
William C. Hedgcock
By Wilkinson & Huxley
Attys

W. C. HEDGCOCK.
BRAKE ARRANGEMENT.
APPLICATION FILED JULY 5, 1917.

1,283,759.

Patented Nov. 5, 1918.
3 SHEETS—SHEET 3.

Witnesses:
Fed. C. Kerson
Chas. L. Byron

Inventor:
William C. Hedgcock
By Wilkinson & Huxley
Attys

UNITED STATES PATENT OFFICE.

WILLIAM C. HEDGCOCK, OF CHICAGO, ILLINOIS, ASSIGNOR TO AMERICAN STEEL FOUNDRIES, OF CHICAGO, ILLINOIS, A CORPORATION OF NEW JERSEY.

BRAKE ARRANGEMENT.

1,283,759.      Specification of Letters Patent.      Patented Nov. 5, 1918.

Application filed July 5, 1917. Serial No. 178,586.

*To all whom it may concern:*

Be it known that I, WILLIAM C. HEDGCOCK, a citizen of the United States, and resident of Chicago, in the county of Cook and State of Illinois, have invented certain new and useful Improvements in Brake Arrangements, of which the following is a specification.

This invention relates to brake mechanism.

One object of the invention is to eliminate brake beams, and the necessary weight and cost in connection therewith.

Another object is to provide a simple and compact brake mechanism adapted to meet the various requirements for successful commercial operation.

These and other objects are accomplished by providing in combination a support, a hanger pivoted to said support, a brake head carried by said hanger, and a brake lever operatively connected to said hanger whereby braking movement may be transmitted from the brake lever to the brake head.

The invention is illustrated on the accompanying sheets of drawings, in which,

Figure 1 is a side elevation of a brake equipment embodying my invention;

Figs. 2 and 3 are plan and end views, respectively, of the same;

Fig. 4 is a perspective view of the double arm hanger forming a part of my invention;

Fig. 5 is a fragmentary side elevation of a modification of my invention;

Fig. 6 is a perspective view of the same modification shown in Fig. 5;

Fig. 7 is a side elevation, and Fig. 8 an end view of another modification of my invention;

Figure 10:
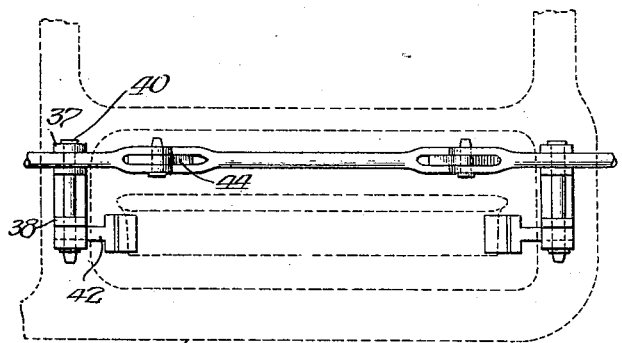
Figs. 10 and 11 are plan and end views, respectively, of the modification shown in Fig. 9, and, Fig. 12 is a perspective view of the modified hanger and associated parts shown in Figs. 9, 10 and 11.

The various novel features of my invention will be apparent from the following description and drawings, and will be particularly pointed out in the appended claims.

There are advantages in eliminating brake beams of braking arrangement for cars; for example, weight, extra material and cost are decreased.

My invention primarily has to do with the elimination of brake beams and the provision of simple improved means in lieu thereof. Referring first to Fig. 1 of the drawings, it will be noted that the usual truck 10 is provided, to which is connected by suitable links 11, a brake lever 12. This brake lever is connected with its associated brake lever 13 by the usual pull rods 14. Pivotally secured to the truck frame 10 by a pin 15 is a hanger 16 having a relatively long arm 17, and a relatively short arm 18. The long arm 17 of the hanger is connected to the lower end of the brake lever 12 by links 19. Pivotally mounted in the lower end of the shorter arm 18 is a brake head 20, carrying a brake shoe 21, which is adapted to engage a car wheel 22 which supports the truck. By means of this simple arrangement when the pull rod transmits a braking movement to the brake levers 12—13, the braking movement will be transmitted through the arms of the hanger and brake head and shoe to the wheel. It is apparent therefore that a simple hanger arm arrangement with many advantages may be provided which may serve the same functions of a brake beam arrangement.

In Figs. 5 and 6, I have shown a modification in which I dispense with the use of links 19 between the brake lever 12 and the relatively long hanger arm 17, and in place thereof substitute a hanger 23 having a relatively long arm 24, the lower end of which is curved and is pivotally connected directly to the lower end of the brake lever 25. The shorter arm 26 on the hanger 23 carries a brake head 27.

In Figs. 7 and 8 I show another modification of the hanger arm arrangement in which the longer arm 28 on the hanger 29 has a laterally extending boss 30 from which projects a pin 31 upon which is pivotally mounted a link 32 which is connected to the lower end of the brake lever 33. In this case the upper bearing portion of the hanger 29 is smaller than those shown in the other modifications. As in the other case the shorter arm 34 carries the brake head 35.

Figure 9:
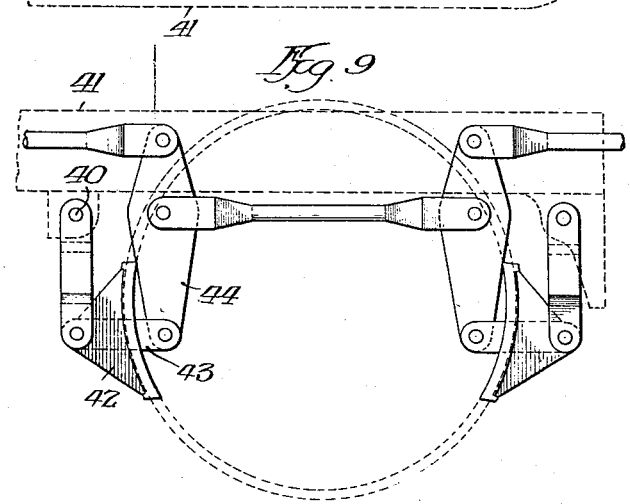
Fig. 9 is a side elevation of a braking equipment disclosing another modification of my invention.
Figure 11:
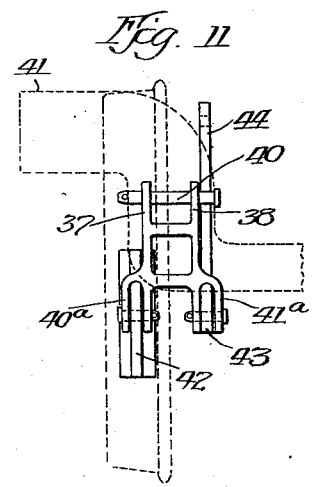
Figure 12:
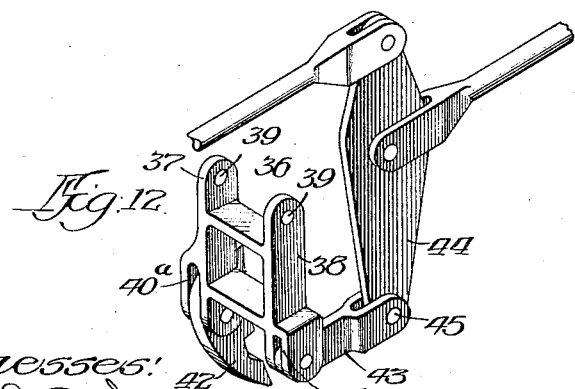

In Figs. 9 to 12, inclusive, I show still another modification in which the hanger 36 has two oppositely arranged arms 37 and 38 of the same length in the upper ends of which are provided openings 39 for the reception of a pin 40 by means of which a hanger is pivotally connected to the truck frame 41. The lower ends of the arms 37—38 are provided with forked portions 40ª—41ª, respectively, in the former of which is pivotally mounted a brake head 42 and in the latter of which is pivotally mounted a link 43 which is forced at its opposite ends and receives the lower end of the brake lever 44 to which it is pivotally connected by a pin 45.

In all of these arrangements I have avoided the use of a brake beam and have provided in lieu thereof various forms of hangers, the arms of which are properly supported and operatively connected to the brake levers and brake heads and shoes whereby effective braking action may be transmitted to the wheels against which the brake shoes operate.

There may be further modifications of the invention other than those particularly shown and described, and it is my intention to cover all such modifications which do not involve a departure from the spirit and scope of the invention as set forth in the following claims.

I claim:

1. In combination, a support, a hanger connected to said support having portions offset with respect to each other, a brake head carried by one portion of said hanger, and a brake lever operatively connected to said support and operatively connected to another portion of said hanger whereby a braking movement may be transmitted from the brake lever to the brake head.

2. In combination, a support, a hanger pivoted to said support and having a plurality of arms, a brake head carried by one of said arms, and a supported brake lever operatively connected to the other of said arms whereby braking movement may be transmitted from the brake lever to the brake head.

3. In combination, a support, a hanger pivoted to said support, and having a plurality of arms, a brake head carried by one of said arms, a supported brake lever, and a link connection between the other arm of said hanger and said brake lever whereby a braking movement may be transmitted from the brake lever to the brake head.

4. In combination, a support, a hanger pivoted to said support and having arms of different lengths, a brake head carried by the shorter arms, and a supported brake lever operatively connected to the longer arm whereby a braking movement may be transmitted from the brake lever to the brake head.

5. In combination, a support, a hanger pivoted to said support and having arms of different lengths, a brake head carried by the shorter arm, a supported brake lever, and a link connection between the longer arm of said hanger and brake lever whereby braking movement may be transmitted from the brake lever to the brake head.

6. In combination, a wheel, a supported hanger mounted for swinging movement and having a plurality of arms, a brake head carried by one of said arms, and a supported brake lever operatively connected to the other of said hanger arms whereby braking movement may be transmitted from the brake lever through the brake head to the wheel.

Signed at Chicago, Illinois, this 30th day of June, 1917.

WILLIAM C. HEDGCOCK.

Witnesses:
AMANDA F. WADE,
CHAS. L. BYRON.

Copies of this patent may be obtained for five cents each, by addressing the "Commissioner of Patents, Washington, D. C."